United States Patent [19]

Konno

[11] Patent Number: 5,226,030
[45] Date of Patent: Jul. 6, 1993

[54] MAGNETO-OPTICAL RECORDING AND REPRODUCING DEVICE

[75] Inventor: Youichi Konno, Saitama, Japan

[73] Assignee: Pioneer Electronic Corporation, Tokyo, Japan

[21] Appl. No.: 676,588

[22] Filed: Mar. 28, 1991

[30] Foreign Application Priority Data

Apr. 13, 1990 [JP] Japan .................................. 2-96532

[51] Int. Cl.$^5$ .................... G11B 7/00; G11B 5/127
[52] U.S. Cl. ........................ 369/110; 360/114
[58] Field of Search ............ 369/110, 44.14; 360/114

[56] References Cited

U.S. PATENT DOCUMENTS

| | | | |
|---|---|---|---|
| 4,672,594 | 6/1987 | Kato et al. | 360/114 |
| 4,787,002 | 11/1988 | Isozaki | 360/118 |
| 4,939,711 | 7/1990 | Yoda | 360/114 |
| 5,093,816 | 3/1992 | Taniguchi et al. | 360/114 |

Primary Examiner—Bruce C. Anderson
Attorney, Agent, or Firm—Sughrue, Mion, Zinn, Macpeak & Seas

[57] ABSTRACT

A magneto-optical recording and reproducing device in which recording is carried out by applying a modulated laser beam and a bias magnetic field to a recording point of a magneto-optical recording disc and erasing is carried out by reversing a direction of the bias magnetic field and continuously applying a laser beam to the recording point. The device includes an electromagnet (2) for applying the bias magnetic field, a carriage (3) on which a laser for irradiating the laser beam is mounted, an actuator including magnets (4) and coils (5) for controlling the focal point of the laser beam, a linear motor including magnets (7), yokes (8) and coils (6) for linearly moving the carriage (3). In one embodiment, the polarities of the magnets (4, 7) of the actuator and linear motor, respectively, are arranged such that a direction of the magnetic field of the actuator is opposite to that of the linear motor so as to minimize the resulting magnetic flux. In another embodiment, the magnets (7) of the linear motor are arranged such that the polarities of the magnets are opposite one another to form a closed magnetic path.

1 Claim, 2 Drawing Sheets

MAGNETO-OPTICAL RECORDING AND REPRODUCING DEVICE

BACKGROUND OF THE INVENTION

1. Field of the Invention

The present invention relates to an improved magneto-optical recording and reproducing device in which a bias magnetic field is applied and a modulated laser beam is irradiated to record a signal by a slight rotation of a polarized plane of a reflected beam at a recording point on a disc and the reverse bias magnetic field is applied and the laser beam is irradiated to erase the signal. The focus of the laser beam is controlled by a magnetic field and a current produced by an actuator, and a laser irradiating carriage is linearly moved by a linear motor.

2. Description of the Prior Art

A conventional recording and reproducing device is illustrated in FIGS. 1 and 2 where FIG. 1 illustrates a recording condition and FIG. 2 illustrates an erasing condition.

Referring to FIG. 1, a recording surface of a magneto-optical disc 1 is formed of a magnetic thin film of TbFeCo alloy, or the like. A signal is recorded by slightly rotating a polarized plane of a reflected beam in a direction related to a magnification while a bias magnetic field having constant direction and a modulated laser beam are applied to the recording surface. The recorded signal is reproduced by means of a detector utilizing a polarizing beam splitter.

In contrast, referring to FIG. 2, the recorded signal is erased by applying a reverse bias magnetic field in a direction opposite to the bias magnetic field in the recording operation and irradiating a laser beam continuously to provide a polarized plane of a reflected beam in a uniform direction.

More specifically, in recording a signal on the magneto-optical disc 1, a magnetic field created by an electromagnet 2 is applied to a surface of the disc in advance so as to cause the side 1 of the magneto-optical disc to be, for example, an S pole, as illustrated in FIG. 1. An actuator for driving an objective lens so as to focus the lens on the recording surface of the magneto-optical disc is arranged on a carriage 3 carrying a laser irradiating apparatus. The actuator comprises magnets 4 and coils 5 which operate to focus the laser beam on the recording surface by driving the objective lens to or away from the magneto-optical disc 1 based on the current flowing in the coils 5. For driving the carriage, coils 6 respectively wound on yokes 8 are arranged on the carriage 3 and magnets 7 are linearly disposed respectively opposing the coils 6 with the same polarization as the coils. The carriage 3 is linearly driven by an attraction or repulsion between a current flowing in the coils 6 and the magnets 7 to radially drive a focused point of the laser beam on the recording surface of the turning magneto-optical disc 1. The laser beam is modulated and a signal is recorded on the recording surface of the magneto-optical disc 1 whether a polarized plane of the reflected beam is rotated or not.

On the other hand, as shown in FIG. 2, a recorded signal is erased by maintaining a polarized plane of a modulated reflected beam in a uniform direction by reversing a current flow in the magnet 2 so as to make the side of the magneto-optical disc 1 a N pole and irradiating a laser beam continuously on the surface. In such a magneto-optical recording and reproducing device, the magnets 4 of the actuator and the magnets 7 of the linear motor are disposed so that the N poles are symmetrical with respect to the center, as shown in FIG. 2.

In such a magneto-optical recording device, in the recording condition illustrated in FIG. 1, a closed magnetic path is formed between the electromagnet 2 and the magnets 4, 7, and consequently the magnetic fluxes of the electromagnet 2 and magnets 4, 7 pass through the magneto-optical disc 1 in the same direction so as to increase the total magnified flux and strengthen the magnetic field.

On the other hand, in the erasing condition illustrated in FIG. 2, the magnetic field created by the electromagnet 2 is in the opposite direction of the magnetic field created by the magnets 4, 7, and consequently the magnetic flux through the magneto-optical disc 1 decreases to weaken the magnetic field.

The difference of the magnetic force passing through the magneto-optical disc 1 between the recording condition and erasing condition is large, so that in the erasing condition it is necessary to strengthen the magnetic field by increasing the current flowing in the electromagnet 2. Therefore, a special circuit to control the current is required. Further, when the same amount of current flows in the electromagnet 2 during the recording and erasing condition, the magnetic field of the magnets 4, 7 must not influence the magnetic field of the electromagnet 2. Therefore, the distance between the electromagnet 2 and the magnets 4, 7 must be sufficiently large, or the magnets 4, 7 must be surrounded by a magnetic shield. The former results in the carriage becoming large in size requiring additional space and weight. The latter results requires a magnetic shield also resulting in additional weight.

SUMMARY OF THE INVENTION

The object of the present invention is to provide a magneto-optical recording and reproducing device which does not require circuits for strengthening the magnetic field applied in the erasing condition.

A further object of the invention is to minimize the difference between the magnetic field intensity applied to a magneto-optical disc in the recording condition and erasing condition by changing the poles of the actuators and the linear motors.

The object of the present invention is achieved by means of disposing the poles of the magnets such that the magnetic fields of the actuator and the linear motor are directed in a direction reverse to each other. In the magneto-optical recording and reproducing device provided by the present invention, the magnet of the actuator and the magnets of the linear motor are disposed in the above-described manner, and the magnetic field direction of the magnets of the actuator and the magnetic field direction of the magnets of the linear motor are directed in opposite directions. Therefore the magnetic field of the actuator and the magnetic field of the linear motor repulse each other and the leakage flux of the magnetic field of the linear motor proximate the recording point on the magneto-optical disc are minimized, and the influence on the bias magnetic field is also minimized.

The same object is also achieved by means of disposing the pairs of magnets which form the magnetic field of the linear motor such that the reverse poles of each of the magnets oppose one another. The influence of the leakage flux for the magnetic field applied to the magneto-optical disc is reduced by means of disposing the magnets of the linear motor to form the closed magnetic path by opposing the reverse poles, as explained above.

In each diagram, the dotted lines represent the magnetic flux.

DESCRIPTION OF THE PREFERRED EMBODIMENT

A preferred embodiment of the present invention will be described with reference to FIG. 3.

Figure 1:
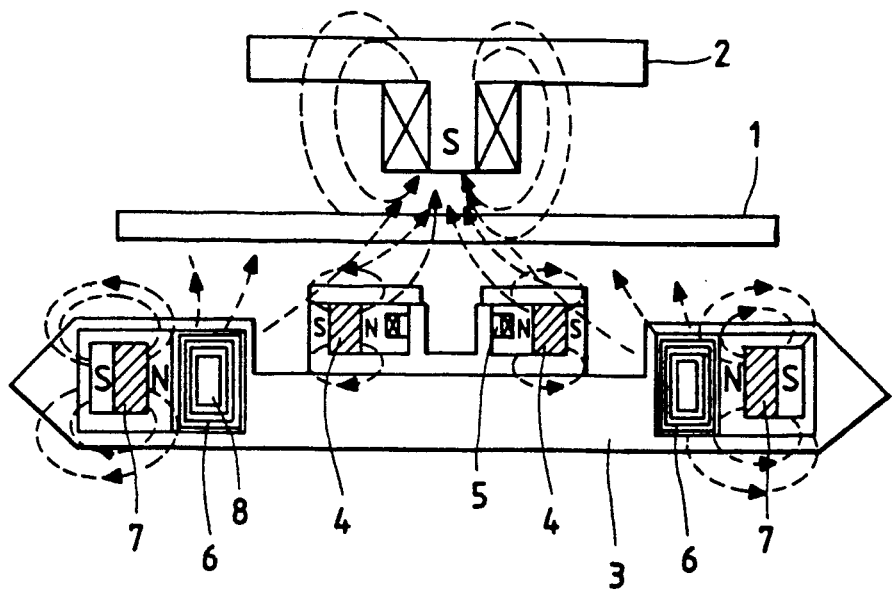
FIG. 1 is a schematic diagram showing a conventional magneto-optical recording and reproducing device in the recording condition.
Figure 2:
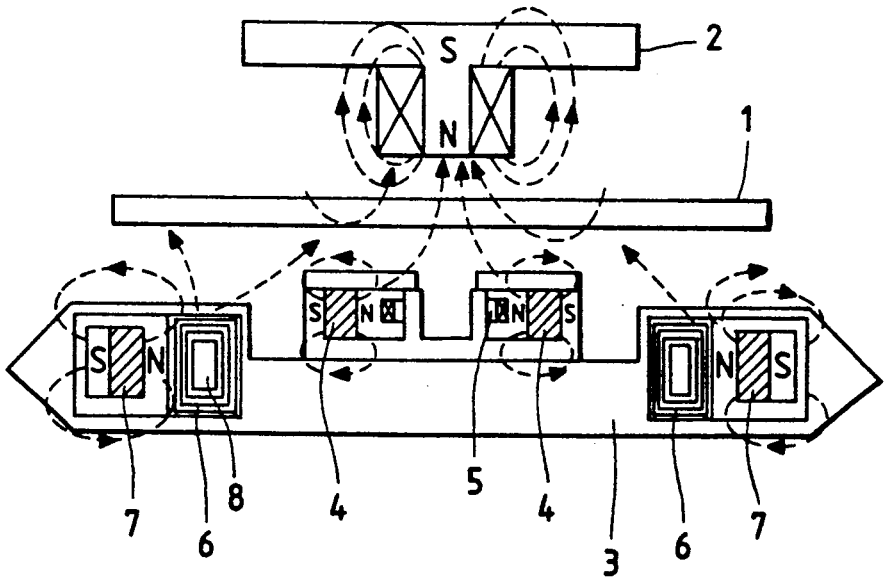
FIG. 2 is a schematic diagram showing a conventional magneto-optical recording and erasing device in the erasing condition.
Figure 3:
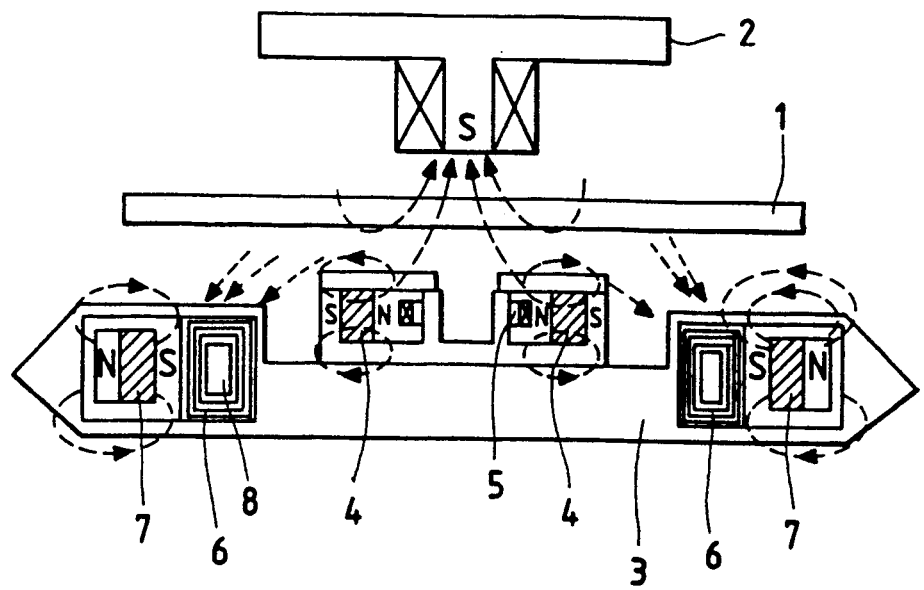
FIG. 3 is a schematic diagram showing an embodiment of the present invention.

FIG. 3 illustrates a magneto-optical disc 1, an electromagnet 2 which applies a magnet field to the disc 1, a carriage 3 which transports the laser apparatus radially with respect to the disc 1, and magnets 4 and coils 5 which together act as an actuator for focusing a laser beam. The carriage 3 is linearly driven by a linear motor, which comprises magnets 7 and coils 6 wound on the yoke 8.

Conventionally, a signal is recorded and erased on the magneto-optical disc 1 by the magnetic field of the electromagnet 2 applied to the disc and the irradiated laser beam. In this embodiment, as shown in FIG. 3, the side of the electromagnet 2, which applies the bias magnetic field, opposing the disc 1 is, for example, the S pole. Further, the inside magnetic pole of the actuator 4 is the N pole, and the magnetic field of the magnets 7 of the linear motor opposing the actuator is, for example, the S pole. Thus, the magnetic field direction of the actuator is opposite to that of the linear motor. Consequently, the S pole of each of the magnets 4 of the actuator opposes the S pole of each of the respective adjacent magnets 7 of the linear motor to repulse each other.

Therefore, at the recording and erasing points on the magneto-optical disc 1 which are irradiated by the laser beam, each the magnetic fields generated by the actuator and the linear motor offsets the other so as not to influence the bias magnetic field formed by the electromagnet 2.

Next, another preferred embodiment of the present invention will be described with reference to FIG. 4, wherein like reference numerals in FIGS. 3 and 4 designate the same elements.

Figure 4:
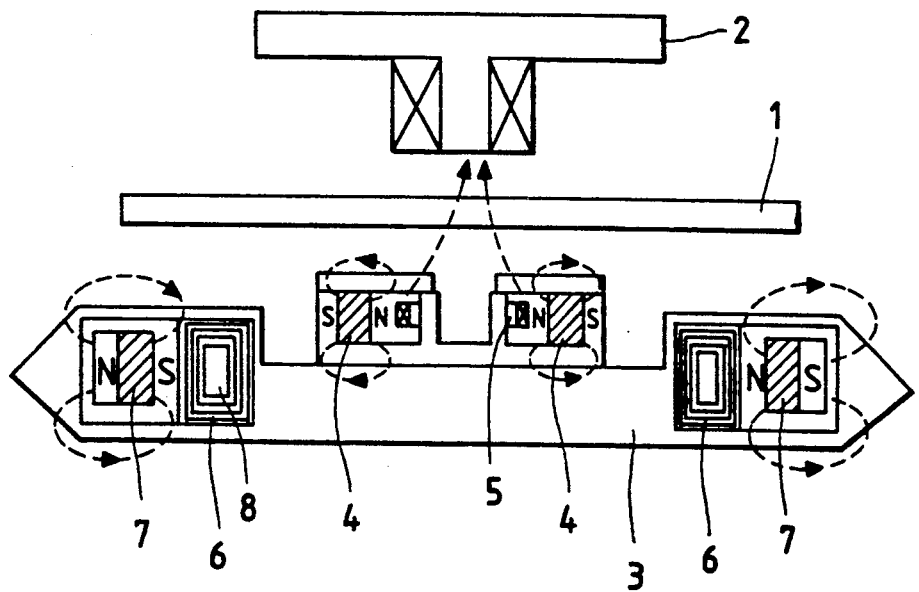
FIG. 4 is a schematic diagram showing another embodiment of the present invention.

In this embodiment, each of magnets 7 which constitute the linear motor are disposed such that reverse poles of the respective magnets oppose one another, as illustrated in FIG. 4. In this manner, the magnetic field directions respectively generated by the magnets are in the same direction so as to be in the right-hand direction or the left-hand direction. Therefore, a closed magnetic path is formed in each of the magnets 7, and the leakage flux from the linear motor decreases remarkably proximate the magneto-optical disc 1 in comparison with the conventional arrangement.

The magnets 4 of the actuator only drive light weight parts such as the objective lens, so it is not necessary to use strong magnets. The leakage flux is therefore minimal so the bias magnetic field is not significantly influenced.

While the leakage flux from the linear motor can become a significant factor in the alternating strength of the bias magnetic field, the leakage flux from the linear motor on the recording or erasing points of the magneto-optical disc 1 is so small that it may be ignored.

Therefore, in both the above embodiments, the magnetic field strength changes very little even if the magnetic field direction of the electromagnet 2 alternates in the recording condition and erasing condition.

As described above, the present invention provides a magneto-optical recording and reproducing device which records and erases signals by using a bias magnetic field and a laser beam. Even if the direction of the bias magnetic field is reversed in the recording condition and erasing condition, the magnetic fields generated by the actuator and the linear motor do not remarkably alternate. Therefore, in the erasing condition, it is not necessary to use electric circuits for strengthening the bias magnetic field or a magnetic shield for shielding the magnets of the actuator and the linear motor. Consequently, it is not necessary to strengthen the driving force, enlarge the spaces to accommodate magnetic shields, or increase the weight of the device.

What is claimed is:

1. A magneto-optical recording and reproducing device in which recording is carried out by applying a modulated laser beam and a bias magnetic field to a recording point of a magneto-optical recording disc and erasing is carried out by reversing a direction of said bias magnetic field and continuously applying a laser beam to said recording point, said device comprising:

an electromagnet for applying said bias magnetic field;

a carriage on which a laser apparatus for irradiating said laser beam is mounted;

an actuator including magnets and coils, a focal point of said laser beam being controlled through a magnetic field and an electric current of said actuator; and a linear motor including magnets, yokes and coils, said carriage being linearly moved by said linear motor through a magnetic field and an electric current of said linear motor;

wherein said magnets of said linear motor are arranged such that reverse poles of said magnets oppose one another so that the respective magnetic fields are in the same direction to form a closed magnetic path.

* * * * *